United States Patent [19]

Bjornson et al.

[11] Patent Number: 4,655,906

[45] Date of Patent: Apr. 7, 1987

[54] HYDROTREATING PROCESS EMPLOYING A NOVEL CATALYTIC COMPOSITION

[75] Inventors: Geir Bjornson; Douglas D. Klendworth; Lloyd E. Gardner; Floyd E. Farha, Jr., all of Bartlesville, Okla.

[73] Assignee: Phillips Petroleum Company, Bartlesville, Okla.

[21] Appl. No.: 858,772

[22] Filed: May 2, 1986

[51] Int. Cl.$^4$ ............................................. C10G 45/08
[52] U.S. Cl. ................................... 208/217; 208/144; 208/254 H; 208/263; 208/112; 502/300; 502/307; 502/309; 502/314; 502/315; 502/329; 502/342; 502/350; 502/351
[58] Field of Search ............... 208/144, 254 H, 217, 208/263, 112; 502/241, 263, 314, 300, 307, 309, 315, 329, 342, 350, 351

[56] References Cited

U.S. PATENT DOCUMENTS

| | | | |
|---|---|---|---|
| 3,915,894 | 10/1975 | Clements et al. | 208/254 H |
| 3,969,222 | 7/1976 | Hayes | 208/217 |
| 3,975,259 | 8/1976 | Doelp | 208/217 |
| 4,263,132 | 4/1981 | Drehman et al. | 208/134 |
| 4,287,050 | 9/1981 | Eastman et al. | 208/215 |
| 4,313,820 | 2/1982 | Farha et al. | 208/213 |
| 4,324,647 | 4/1982 | Gardner | 208/111 |
| 4,333,855 | 6/1982 | Gardner et al. | 252/439 |
| 4,371,458 | 2/1983 | Eastman et al. | 252/439 |
| 4,371,507 | 2/1983 | Farha et al. | 423/230 |
| 4,371,728 | 2/1983 | Farha et al. | 585/258 |
| 4,372,842 | 2/1983 | Gardner | 208/254 H |
| 4,376,698 | 5/1983 | Gardner et al. | 208/215 |
| 4,376,699 | 3/1983 | Gardner | 208/215 |
| 4,389,304 | 6/1983 | Eastman et al. | 208/254 H |
| 4,394,301 | 7/1983 | Gardner | 252/455 Z |
| 4,522,709 | 6/1985 | Aldag et al. | 208/216 R |
| 4,541,915 | 9/1985 | Baird, Jr. et al. | 208/154 |

OTHER PUBLICATIONS

Preprints of "Chemistry of Nitrogen Removal", Symposium of Division of Petroleum Chemistry, American Chemical Society, New York, Aug. 23-28, 1981, pp. 924-940 (article by A. M. Tait and A. C. Hensley).

*Primary Examiner*—Andrew H. Metz
*Assistant Examiner*—Anthony McFarlane
*Attorney, Agent, or Firm*—K. K. Brandes

[57] ABSTRACT

A catalyst composition comprises (a) alumina, (b) zinc titanate, (c) at least one compound of molybdenum, (d) at least one compound of at least one of nickel and cobalt, and (e) at least one compound of rhenium. This catalyst composition is used for hydrotreating a liquid hydrocarbon-containing feed stream, which contains organic compounds of sulfur, nitrogen and oxygen under such conditions as to obtain a product having reduced levels of sulfur, nitrogen and oxygen. Preferably the hydrocarbon-containing feed stream contains cycloalkanes, which are at least partially reformed to aromatic compounds.

15 Claims, No Drawings

HYDROTREATING PROCESS EMPLOYING A NOVEL CATALYTIC COMPOSITION

BACKGROUND OF THE INVENTION

In one aspect, this invention relates to a catalytic hydrotreating process for removing organic compounds of sulfur, nitrogen and oxygen from liquid hydrocarbon-containing feed streams. In another aspect, this invention relates to the conversion of cycloalkanes, which are contained in these feed streams, to aromatic hydrocarbons. In a further aspect, this invention relates to a catalyst composition comprising alumina, zinc titanate and transition metal compounds. In still another aspect, this invention relates to the use of this catalyst composition in a process for hydrotreating hydrocarbon-containing feed streams, so as to remove organic compounds of sulfur, nitrogen and oxygen therefrom and to convert cycloalkanes contained in these feed streams to aromatic hydrocarbons.

Zinc titanate-containing catalyst compositions are known. Also the use of zinc titanate-containing catalyst compositions for hydrodesulfurizing and hydrodenitrogenating hydrocarbon-containing feed streams, such as heavy crudes and fractions thereof, is known. However, there is an ever present need to improve zinc titanate-containing catalyst compositions and to use them in improved hydrotreating processes.

SUMMARY OF THE INVENTION

It is an object of this invention to provide a new, effective zinc titanate-containing catalyst composition. It is another object of this invention to hydrotreat a hydrocarbon-containing feed stream in the presence of a new, effective zinc titanate-containing catalyst composition. It is a further object of this invention to remove organic compounds of sulfur, nitrogen and oxygen from hydrocarbon-containing feed streams. It is still another object of this invention to convert cycloalkanes contained in these feed streams to aromatic hydrocarbons. Other objects and advantages will be apparent from the detailed description and the appended claims.

In accordance with this invention, a substantially liquid hydrocarbon-containing feed stream, which contains organic sulfur compounds, organic nitrogen compounds and organic oxygen compounds as impurities, is hydrotreated in a process comprising the step of contacting said hydrocarbon-containing feed stream with hydrogen in the presence of a catalyst composition comprising (a) alumina, (b) zinc titanate, (c) at least one compound of molybdenum, (d) at least one compound selected from the group consisting of nickel compounds and cobalt compounds and (e) at least one compound of rhenium, under such conditions as to obtain a hydrocarbon-containing product stream having reduced levels of sulfur, nitrogen and oxygen.

In one embodiment of this invention, the organic oxygen compounds in the hydrocarbon-containing feed stream comprise phenolic compounds (i.e., aromatic hydrocarbons with at least one OH group attached to an aromatic ring). In another embodiment of the hydrotreating process of this invention, the feed stream further comprises cycloalkanes (preferably cyclohexane and/or alkyl-substituted cyclohexanes) which are at least partially converted to aromatic hydrocarbons (preferably benzene and alkyl-substituted benzenes).

In yet another embodiment of this invention, a composition of matter is provided which comprises (a) alumina, (b) zinc titanate, (c) at least one molybdenum compound, (d) at least one compound of at least one of nickel and cobalt and (e) at least one rhenium compound. Preferably zinc titanate has the chemical formula of $Zn_2TiO_4$. Also, the preferred composition of matter of this invention, which is employed as a catalyst composition in the hydrotreating process of this invention, consists essentially of components (a), (b), (c), (d) and (e).

DETAILED DESCRIPTION OF THE INVENTION

Catalyst Composition

The composition of matter (catalyst composition) of this invention can contain any suitable proportions of components (a), (b), (c), (d) and (e). Preferably, the catalyst composition comprises from about 40 to about 90 weight-% (more preferably about 50–80 weight-%) $Al_2O_3$, from about 2 to about 20 weight-% (more preferably about 5–15 weight-%) zinc titanate, from about 1 to about 20 weight-% (more preferably about 2–15 weight-%) Mo, from about 0.5 to about 8 weight-% (more preferably about 1–5 weight-%) Ni or Co or Ni+Co (if both Ni and Co are present), and from about 0.2 to about 4 weight-% (more preferably about 0.3–2 weight-%) Re. Even though the promoter levels (Ni, Co, Mo, Re) are expressed as weight-% metal, these promoters are generally present as oxides, or if the catalyst composition is presulfided, as oxides and sulfides. All weight percentages are calculated based on the finished (i.e., dried and calcined) composition of matter. The surface area of the composition of matter of this invention generally ranges from about 50 to about 400 $m^2/g$, preferably from about 100 to about 250 $m^2/g$ (determined by the BET/$N_2$ method; ASTM D3037).

The composition of matter of this invention can be prepared by any suitable method. In one preferred embodiment, high surface area alumina and zinc titanate ($Zn_2TiO_4$) are mixed (preferably dry-blended as powders). The mixture can be impregnated with at least one aqueous solution of compounds of Mo, Ni and/or Co and Re, dried, and calcined under such conditions and at a temperature high enough to at least partially convert the compounds of Mo, Ni and/or Co and Re to their oxides. Optionally, the powder mixture can be impregnated and stirred in a liquid, extruded, dried and calcined (as described above). The impregnation can be carried out sequentially in any order or in one step (using a solution containing compounds of Mo, Ni and Co and Re). Preferably, the a mixture of alumina and $Zn_2TiO_4$ (for the preparation of $Zn_2TiO_4$ see U.S. Pat. Nos. 4,287,050 and 4,371,728, herein incorporated by reference) is impregnated sequentially: first with Mo, then with Ni and/or Co, and finally with Re. Preferably drying and, optionally, calcining steps follow each impregnation step (as exemplified in Example I).

Any suitable compounds of Mo, Ni and/or Co and Re can be used for the impregnation steps, as long as these compounds are substantially soluble in water. Non-limiting examples of suitable molybdenum compounds are molybdic oxides and hydroxides, molybdenum blue, molybdic acids, ammonium orthomolybdates, alkali metal orthomolybdates, ammonium dimolybdates, alkali metal dimolybdates, ammonium heptamolybdates, alkali metal heptamolybdates, ammonium isomolybdates, alkali metal isomolybdates, and mixtures thereof. Non-limiting examples of compounds of nickel and/or cobalt are nitrates, sulfates, bisulfates, bicarbonates, monocarboxylates (such as acetates), di- and tricarboxylates (such as oxalates and citrates), thiocyanates, and mixtures thereof. Non-limiting compounds of rhenium are rhenium oxides (such as $Re_2O_7$), rhenic acids (such as $HReO_4$), ammonium and alkali metal perrhenates (such as $KReO_4$, $NH_4ReO_4$ or $(NH_4)_3ReO_5$) and mixtures thereof. The concentration of the compounds of Mo, Ni and/or Co and Re in the impregnating solutions are selected so as to attain desired weight percentages of these metals in the finished composition of matter. Presently preferred compounds of Mo, Ni and Re and concentrations in impregnating solution are described in Example I.

The drying step (after impregnation) is generally carried out at a temperature in the range of from about 25° to about 200° C. (preferably 50°–120° C.), either in air or in inert gas, either at ambient pressure conditions (about 1 atm) or (less preferably) under vacuum conditions. Generally, the dried composition of matter of this invention or one of its precursors contains less than about 20 weight-% water. The rate of drying is controlled so as to avoid surges of water vapor and splattering. Drying times can range from about 0.5 to about 100 hours (preferably 1–30 hours).

The calcining steps (after drying) comprise heating in a non-reducing atmosphere, either in a free oxygen containing gas (such as air) or (less preferably) in an inert gas atmosphere (e.g., nitrogen or helium), at a temperature in the range of from about 350° C. to about 750° C. (preferably from about 500° C. to about 650° C.). The time for calcining will generally range from about 0.1 to about 20 hours (preferably 0.5–10 hours). During calcining substantially all volatile matter (water, carbonaceous materials) is removed, and the compounds of Mo, Ni and/or Co and Re are substantially converted to their oxides.

If an alumina/zinc titanate powder mixture is impregnated, the calcined composition of matter can be pelletized or compacted into various shapes (e.g., spherical, cylindrical, trilobal) for convenient shipping and use in catalyst beds. Optionally, the composition of matter can be presulfided by contacting the calcined composition of matter with a suitable sulfur compound (such as $H_2S$, COS, mercaptans, disulfides), either in gaseous form or dissolved in a suitable solvent (such as a gas oil) so as to at least partially convert the oxides of Mo, Ni and/or Co and Re to their sulfides. Presulfiding conditions comprise a temperature of about 200°–400° C., and a contacting time of about 1–30 hours. It is within the scope of this invention (yet presently less preferred) to employ methods of preparing the composition of matter of this invention other than the one described above. For instance, Co/Mo-promoted mixtures of alumina and zinc titanate can be prepared in accordance with Example I of U.S. Pat. No. 4,287,050 or in accordance with Example I of U.S. Pat. No. 4,522,709, and these Co/Mo-promoted mixtures can then be impregnated with a rhenium compound, dried and calcined.

Hydrotreating Process

The composition matter of this invention can be used as a catalyst composition for a variety of reactions such as hydrocarbon conversion reactions. In one preferred embodiment of this invention, the catalyst composition of this invention is used as a catalyst for hydrotreating substantially liquid hydrocarbon-containing feed streams, which also contain organic compounds of sulfur, nitrogen and oxygen as impurities, and generally also asphaltenes, coke precursors (measured as Ramsbottom carbon residue) and metal compounds. Suitable hydrocarbon containing feed streams include crude oil and fraction thereof, petroleum products, heavy oil extracts, coal pyrolyzates, liquefied coal products, products from tar sands, shale oil and shale oil products. The catalyst compositions are particularly suited for treating feed streams which also contain substantial amounts of cycloalkanes, such as naphtha/kerosine fractions, light and heavy gas oils (boiling range at 1 atm: about 200°–500° F.), light and heavy cycle oils and gas oils (boiling range at 1 atm: about 400°–800° F.), vaccum gas oil (boiling range at 1 atm: about 800°–1000° F.), shale oil fractions and coal tar fractions. Presently preferred feeds are light cycle oil and naphtha.

Generally the hydrocarbon-containing feed streams contain about 0.05–5.0 (preferably about 0.1–3.0) weight-% sulfur, about 0.01–2.0 (preferably about 0.02–1.0) weight-% nitrogen, and about 0.05–4.0 (preferably about 0.1–2.0) weight-% oxygen. The amount of cycloalkanes in the hydrocarbon-containing feed stream can range from about 10 to about 90 weight-%, and is generally in the range of from about 20 to about 80 (preferably 30–60) weight-%. The $API_{60}$ gravity can range from about 5 to about 40, and is generally in the range of 10 to about 30. The hydrocarbon-containing feed stream generally also contains polyaromatics such as naphthalene and alkyl-substituted naphthalenes. Metals such as Ni, V, Fe and As may also be present in the feed as impurities, generally in very small quantities (about 0.1–10 ppm).

Any suitable organic sulfur compound contained in the hydrocarbon-containing feed may be hydrodesulfurized in accordance with the present invention. Suitable organic sulfur compounds include sulfides, disulfides, mercaptans, thiophenes, benzothiophenes, dibenzothiophenes and the like, and mixtures of two or more thereof.

Any suitable organic nitrogen compound contained in the hydrocarbon-containing feed may be hydrodenitrogenized in accordance with the present invention. Suitable organic nitrogen compounds include amines, diamines, pyridines, quinolines, porphyrins, benzoquinolines and the like and mixtures of two or more thereof.

Any suitable organic oxygen compound contained in the hydrocarbon-containing feed may be hydrodeoxygenated in accordance with the present invention. Suitable organic oxygen compounds include carboxylic acids, esters, ethers, aldehydes, ketones, phenols, resorcinols, hydroquinones, naphthols, and the like, and mixtures of two or more thereof.

Any suitable cycloalkane compound contained in the hydrocarbon-containing feed can be converted (reformed) to aromatic compounds. Suitable cycloalkane include alkyl-substituted or unsubstituted cyclohexanes, cycloheptanes, cyclooctanes, cyclononanes, decalins and the like and mixtures of two or more thereof, preferably cyclohexanes.

The hydrotreating process employing the catalyst composition of this invention can be carried out in any apparatus whereby an intimate contact of the catalyst compositions with said hydrocarbon-containing feed stream and a free hydrogen containing gas is achieved, under such conditions as to produce a hydrocarbon containing product having reduced levels of sulfur, nitrogen and oxygen. Generally, a lower level of cycloalkanes and a higher level of aromatic hydrocarbons, as well as lwer Ramsbottom carbon residue and higher API gravity, are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrotreating process can be carried out as a batch process or, preferably, as a continuous process, more preferably in a tubular reactor containing one or more fixed catalyst beds or in a plurality of fixed bed reactors in parallel or in series. The hydrocarbon-containing product stream can be distilled, e.g., in a fractional distillation unit, so as to obtain fractions having different boiling ranges.

The catalyst composition of this invention can be used alone in the hydrotreating process of this invention or may be used in combination with substantially unpromoted refractory materials such as alumina, silica, titania, magnesia, metal silicates, metal aluminates, titania and metal phosphates. Alternating layers of the refractory material and of the catalyst composition can be used, or the catalyst composition can be mixed with the refractory material. Use of the refractory material with the catalyst composition provides for better dispersion of the hydrocarbon-containing feed stream. Even though presently not preferred, other catalysts such as known hydrotreating catalysts (e.g., $NiO/MoO_3$, $CoO/MoO_3$ and $NiO/CoO/MoO_3$ on alumina) may be used in a mixture with the catalyst composition of this invention to achieve simultaneous deoxygenation, desulfurization, denitrogenation, hydrogenation, demetallization and hydrocracking, if desired. It is also within the scope of this invention, to use a layer of the catalyst composition of this invention and one or more layers of these other hydrotreating catalysts in one reactor (stacked catalyst beds), or to use a reactor containing the catalyst invention in conjunction with one or more reactors in series containing these other hydrotreating catalysts, so as to achieve the simultaneous hydrotreating results as cited above.

Any suitable reaction time (contact time) between the catalyst composition, the hydrocarbon containing feed stream and hydrogen gas can be utilized. In general, the reaction time will range from about 0.05 hours to about 10 hours, preferably from about 0.4 to about 5 hours. In a continuous fixed bed operation, this generally requires a liquid hourly space velocity (LHSV) in the range of about 0.10 to about 10 cc of feed per cc of catalyst per hour, preferably from about 0.2 to about 2.5 cc/cc/hr.

The hydrotreating process employing the catalyst composition of the present invention can be carried out at any suitable temperature. The temperature will generally be in the range of about 250° C. to about 500° C. and will preferably be in the range of about 300° C. to about 420° C. Higher temperatures do improve the removal of impurities but temperatures which will have adverse effects on the hydrocarbon containing feed stream, such as excessive coking, will usually be avoided. Also, economic considerations will usually be taken into account in selecting the operating temperature. Lower temperatures than 250° C. (e.g., about 230° C.) can generally be used for lighter feeds such as naphtha streams.

Any suitable pressure may be utilized in the hydrotreating process. The reaction pressure will generally be in the range of about atmospheric pressure (0 psig) to up to 5,000 psig. Preferably, the pressure will be in the range of about 100 to about 2500 psig. Higher pressures tend to reduce coke formation but operating at high pressure may be undersirable for safety and economic reasons.

Any suitable quantity of hydrogen can be added to the hydrotreating process. The quantity of hydrogen used to contact the hydrocarbon containing feed stock will generally be in the range of about 100 to about 10,000 standard cubic feet $H_2$ per barrel of the hydrocarbon containing feed stream and will more preferably be in the range of about 1,000 to about 5,000 standard cubic feet $H_2$ per barrel of the hydrocarbon containing feed stream. Either pure hydrogen or a free hydrogen containing gas mixture (e.g., $H_2$ and $CH_4$, or $H_2$ and $CO$, or $H_2$ and $N_2$) can be used.

In general, the catalyst composition is utilized primarily for desulfurization, denitrogenation, deoxygenation and reforming (conversion of cycloalkanes to aromatics). The time in which the catalyst composition of this invention will maintain its activity for the above process will depend upon the hydrotreating conditions and the catalyst composition of the hydrocarbon-containing feed. Generally, the temperature of the hydrotreating process is gradually increased to compensate for loss of catalyst activity due to fouling (e.g., due to coke deposits). The catalyst can, if desired, be regenerated when its activity has dropped below a desired level. Catalyst regeneration can be carried out by discontinuing the flow of hydrogen and of the hydrocarbon-containing feed stream and then heating the catalyst composition in a free oxygen containing gas atmosphere (such as air) under such conditions as to remove carbonaceous materials and to at last partially convert sulfides of Mo, Co and/or Ni and Re back to their oxides. Generally the catalyst regeneration step is carried out at about 400°-650° C. and at a pressure of about 0-1,000 psig.

At least a portion of the hydrotreated product stream of this invention can subsequently be isomerized or can be cracked, e.g., in a fluidized catalytic cracking unit under such conditions as to produce lower boiling hydrocarbon materials suitable for use as fuels and other useful products. It is within the scope of this invention to hydrotreat the product stream having reduced S, N and O contents in a process using a different catalyst composition, such as alumina-supported $NiO/MoO_3$ or $CoO/MoO_3$ catalysts, for further removal of sulfur and other impurities (e.g., metals) before the product stream is introduced into a cracking reactor and treated under cracking conditions, or before the product stream is isomerized.

The following examples are presented in further illustration of the invention and are not to be considered as unduly limiting the scope of this invention.

EXAMPLE I

This example illustrates the preparation of promoted zinc titanate/alumina catalysts.

Control Catalyst A was Mo/Ni-impregnated zinc titanate/alumina and was prepared as follows: A mixture of about 10 weight-% zinc titanate and about 90 weight-% alumina, which was made by intimate dry-blending of appropriate amounts of $Zn_2TiO_4$ and $Al_2O_3$, was impregnated with compounds of nickel and molybdenum. 130.5 grams of the above zinc titanate/alumina mixture were treated with 125 cc of an aqueous solution having a concentration of 173.2 grams of $(NH_4)_6Mo_7O_{24}.4H_2O$ per liter solution. The thus treated $Zn_2TiO_4/Al_2O_3$ mixture was dried and then calcined at about 1000° F. for about 4 hours in air. 147.6 grams of the Mo-impregnated $Zn_2TiO_4/Al_2O_3$ were treated with 109 cc of an aqueous solution having a concentration of 198.2 grams of $Ni(NO_3)_2.6H_2O$ per liter of solution. The thus treated material was dried and calcined in air at about 1000° F. for about 4 hours. The Mo/Ni-impregnated $Zn_2TiO_4/Al_2O_3$ contained 7.13 weight-% Mo (calculated as Mo metal; present as oxide(s) of Mo) and 2.81 weight-% Ni (calculated as Ni metal; present as oxide(s) of Ni) and had a surface area (BET/$N_2$ method; ASTM D3037) of 173 $m^2/g$.

Invention Catalyst B was Re/Mo/Ni-impregnated zinc titanate/alumina and was prepared as follows. 22.78 grams of Catalyst A was treated with 25 cc of an aqueous solution having a concentration of 9.6 grams $NH_4ReO_4$ (ammonium perrhenate) per liter solution. The thus impregnated material was dried and calcined in air at about 1000° F. for about 4 hours.

Catalyst B contained 0.86 weight-% Re (calculated as Re metal; present as oxide(s) of Re) and had a surface area of 171 $m^2/g$.

Control Catalyst C was Mo/Co-impregnated $Zn_2TiO_4/Al_2O_3$. It was prepared by impregnating a dry-blended mixture of zinc titanate and alumina (see under Catalyst A) with aqueous solutions of molybdenum and cobalt compounds, substantially in accordance with the procedure for Catalyst A, except that a cobalt compound was used instead of a nickel compound. Calcined Catalyst C had a surface area of 181 $m^2/g$ and contained 5.09 weight-% CoO, 14.19 weight-% $MoO_3$, 4.64 weight-% ZnO, 2.10 weight-% $TiO_2$, $Al_2O_3$ as the balance.

Invention Catalyst D was Re/Mo/Co-impregnated zinc titanate/alumina and was prepared by impregnating 15 cc of Catalyst C with an aqueous solution containing 0.96 gram $NH_4ReO_4$ per 100 cc solution so as to attain a dried material (heated at about 200° C. under vacuum) that contained about 0.5 weight-% Re.

Invention Catalyst D was prepared in a similar manner as Catalyst D but contained about 1 weight-% Re. About 72 cc of an aqueous solution of $HReO_4$ (containing 1.3 g Re) was used to impregnate Catalyst C.

EXAMPLE II

This example illustrates the use of various promoted zinc titanate catalysts (described in Example I) for the removal of sulfur from a light cycle oil feed ($API_{60}$ gravity: about 21; sulfur content: 1.57 weight-%; polyaromatics content: 40 weight-%). The sulfur control was determined by X-ray fluoresence spectrometry; the polyaromatics (aromatic hydrocarbons with condensed benzene rings) were analyzed by mass spectrometry.

The oil feed was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 30 cc of low surface area α-alumina (14 mesh Alundum; surface area less than 1 $m^2$/gram), a middle layer of 12.5 cc of one of the hydrofining catalysts described in Example I mixed with 37.5 cc of 36 mesh Alundum, and a bottom layer of about 30 cc of Alundum.

Hydrogen was introduced in the reactor through a tube that concentrically surrounded the oil induction tube but extended only as far as the reactor top. The reactor was heated with a 3-zone furnace. The reactor temperature was measured in the catalyst bed at three different locations by three separate thermocouples embedded in an axial thermocouple well (0.25 inch out diameter). The liquid product oil was generally collected every day for analysis. The hydrogen gas was vented. Reaction conditions comprised a pressure of about 600 psig, a liquid hourly space velocity (LHSV) of about 4.0 cc oil/cc catalyst/hour and a temperature ranging from 495° F. to 675° F. Pertinent hydrotreating results are summarized in Table I.

TABLE I

| Temperature (°F.) | Run 1 (Control) A (Mo/Ni) | Run 2 (Invention) B (Mo/Ni/Re) | Run 3 (Control) C (Mo/Co) | Run 4 (Invention) D (Mo/Co/Re) |
|---|---|---|---|---|
| | | Catalyst | | |
| | % Removal of Sulfur | | | |
| 495 | 39 | 41 | 44 | 52 |
| 525 | 52 | 57 | 66 | 69 |
| 550 | 63 | 72 | 76 | 79 |
| 575 | 68 | 82 | 82 | 85 |
| 600 | 80 | 86 | 87 | 90 |
| 625 | 87 | 90 | 90 | 93 |
| 650 | 92 | 93 | 93 | 95 |
| 675 | 95 | 95 | 94 | 96 |
| | % Removal of Polyaromatics | | | |
| 495 | 19 | 20 | 8 | 16 |
| 550 | 33 | 38 | 26 | 27 |
| 600 | 53 | 61 | 42 | 51 |
| 625 | 65 | 67 | 51 | 60 |
| 650 | 69 | 71 | 61 | 62 |

Data in Table I clearly show that the removal of sulfur and the removal of polyaromatics (by hydrogenation) from the feed was consistently higher when Re-containing catalysts B and D were used (compare run 2 with run 1 and run 4 with run 3).

EXAMPLE III

This example illustrates the removal of organic compounds which contain chemically bound oxygen, sulfur and nitrogen from a naphtha fraction of a coal tar by hydrotreatment of a Re/Co/Mo-promoted zinc titanate (alumina catalyst) (Catalyst D'). The compositions of the feed and of products hydrotreated in runs 5 and 6 in the presence of Catalyst D' and pertinent process conditions are summarized in Table II.

TABLE II

| | Feed | Product of Run 5 | Product of Run 6 |
|---|---|---|---|
| Reaction Temp. (°C.) | — | 345 | 350 |
| $H_2$ Pressure (psig) | — | 700 | 1200 |
| LHSV | — | 1.0 | 1.0 |
| Average Molecular Weight | 116 | 119 | 112 |
| ppmw O | 6300 | 1900 | —[1] |
| ppmw S | 4400 | 8 | 56 |
| ppmw N | 640 | —[1] | 69 |
| Benzenes[2] (wt %) | 18.4 | 28.5 | 54.3 |
| Cyclohexanes[3] (wt %) | 42.8 | 42.9 | 19.6 |
| Indanes[4] (wt %) | 6.8 | 13.2 | 18.3 |
| Naphthalenes[5] (wt %) | 2.4 | 2.9 | 3.0 |
| Phenols[6] (wt %) | 8.2 | 0.5 | 0.3 |
| Decalins and Resorcinols (wt %) | 20.5 | 11.6 | 3.2 |

TABLE II-continued

|  | Feed | Product of Run 5 | Product of Run 6 |
|---|---|---|---|
| Others[8] (wt %) | 0.4 | 0.5 | 0.3 |

[1] not determined
[2] determined by mass spectrometry; 78 type compounds; average molecular weight: 107–117
[3] determined by mass spectrometry; 94 type compounds; average molecular weight: 105–113
[4] determined by mass spectrometry; 118 type compounds; average molecular weight: 128–131
[5] determined by mass spectrometry; 128 type compounds; average molecular weight: 107–122
[6] determined by mass spectrometry; 94 type compounds; average molecular weight: about 111
[7] determined by mass spectrometry; 138 type compounds; average molecular weight: 126–133
[8] Indenes and naphthenbenzenes; determined by mass spectrometry Data in Table I demonstrate that hydrotreatment of a hydrocarbon-containing feed stream, in particular a coal liquid fraction which contains organic, oxygen, sulfur and nitrogen compounds, in the presence of a Re/Mo/Co-promoted zinc titanate/alumina catalyst resulted in simultaneous removal of most of these O-, N- and S-compounds (especially phenols and resorcinols) and in the conversion of the feed to a product (useful as motor fuel) having a higher aromatics content.

Reasonable variations and modifications are possible within the scope of the disclosure and the appended claims.

We claim:

1. A process for hydrotreating a substantially liquid hydrocarbon-containing feed stream, which also contains organic sulfur compounds, organic nitrogen compounds and organic oxygen compounds, said process comprising the step of contacting said hydrocarbon-containing feed stream with hydrogen in the presence of a catalyst composition consisting essentially of
    (a) alumina,
    (b) zinc titanate,
    (c) at least one compound of molybdenum,
    (d) at least one compound selected from the group consisting of nickel compounds and cobalt compounds, and
    (e) at least one compound of rhenium,
    under such hydrotreating conditions as to obtain a hydrocarbon-containing product stream having reduced levels of sulfur, nitrogen and oxygen.

2. A process in accordance with claim 1, wherein said organic oxygen compounds comprise phenolic compounds.

3. A process in accordance with claim 1, wherein said hydrocarbon-containing feed stream additionally comprises cycloalkanes, and at least a portion of said cycloalkanes is converted to aromatic hydrocarbons.

4. A process in accordance with claim 3, wherein said cycloalkanes comprise at least one of cyclohexane and alkyl-substituted cycloalkanes, and said aromatic hydrocarbons comprise at least one of benzene and alkyl-substituted benzenes.

5. A process in accordance with claim 3, wherein the amount of cycloalkanes in said hydrocarbon-containing feed stream is in the range of from about 10 to about 90 weight-%.

6. A process in accordance with claim 3, wherein the amount of cycloalkanes in said hydrocarbon-containing feed stream is in the range of from about 20 to about 80 weight-%.

7. A process in accordance with claim 1, wherein said feed stream contains from about 0.05 to about 5.0 weight-% S, from about 0.01 to about 2.0 weight-% N, and from about 0.05 to about 4.0 weight-% O.

8. A process in accordance with claim 1, wherein said feed stream contains from about 0.1 to about 3.0 weight-% S, from about 0.02 to about 1.0 weight-% N and from about 0.1 to about 2.0 weight-% O.

9. A process in accordance with claim 1, wherein said hydrotreating conditions comprise a reaction time in the range of from about 0.05 to about 10 hours, a temperature in the range of from about 250° to about 500° C., a pressure in the range of from about 0 to about 5,000 psig, and a quantity of added hydrogen in the range of from about 100 to about 10,000 standard cubic feed of $H_2$ per barrel of hydrocarbon-containing feed.

10. A process in accordance with claim 1, wherein said hydrotreating conditions comprise a reaction time in the range of from about 0.4 to about 5.0 hours, a temperature in the range of from about 300° to 420° C., a pressure in the range of from about 100 to about 2,500 psig, and a quantity of added hydrogen in the range of from about 1,000 to about 5,000 standard cubic feet of hydrogen per barrel of hydrocarbon-containing feed.

11. A process in accordance with claim 1 wherein said catalyst composition comprises from about 40 to about 90 weight-% $Al_2O_3$, from about 2 to about 20 weight-% zinc titanate, from about 1 to about 20 weight-% Mo, from about 0.5 to about 8 weight-% of at least one of Ni and Co, and from about 0.2 to about 4 weight-% Re, all based on the catalyst composition, and the surface area of said catalyst composition is in the range of from about 50 to about 400 m$^2$/g.

12. A process in accordance with claim 1, wherein said catalyst composition comprises from about 50 to about 80 weight-% $Al_2O_3$, from about 5 to about 15 weight-% zinc titanate, from about 2 to about 15 weight-% Mo, from about 1 to about 5 weight-% of at least one of Ni and Co, and from about 0.3 to about 2 weight-% Re, all based on the catalyst composition, and the surface area of said catalyst composition is in the range of from about 100 to about 250 m$^2$/g.

13. A process in accordance with claim 1, wherein said catalyst composition has been presulfided.

14. A process in accordance with claim 1 comprising the additional steps of:
    discontinuing the flow of hydrogen and of the hydrocarbon-containing feed stream, and heating the catalyst composition in a free oxygen-containing gas atmosphere under such conditions as to remove carbonaceous materials therefrom.

15. A process in accordance with claim 14, wherein said heating in a free oxygen-containing gas atmosphere is carried out at a temperature in the range of from about 400° to about 650° C.

* * * * *